Oct. 11, 1955   V. J. McCARTHY ET AL   2,720,391
AUGER BORING HEAD FOR MINING COAL AND OTHER MINERALS
Filed Aug. 3, 1953   3 Sheets-Sheet 1
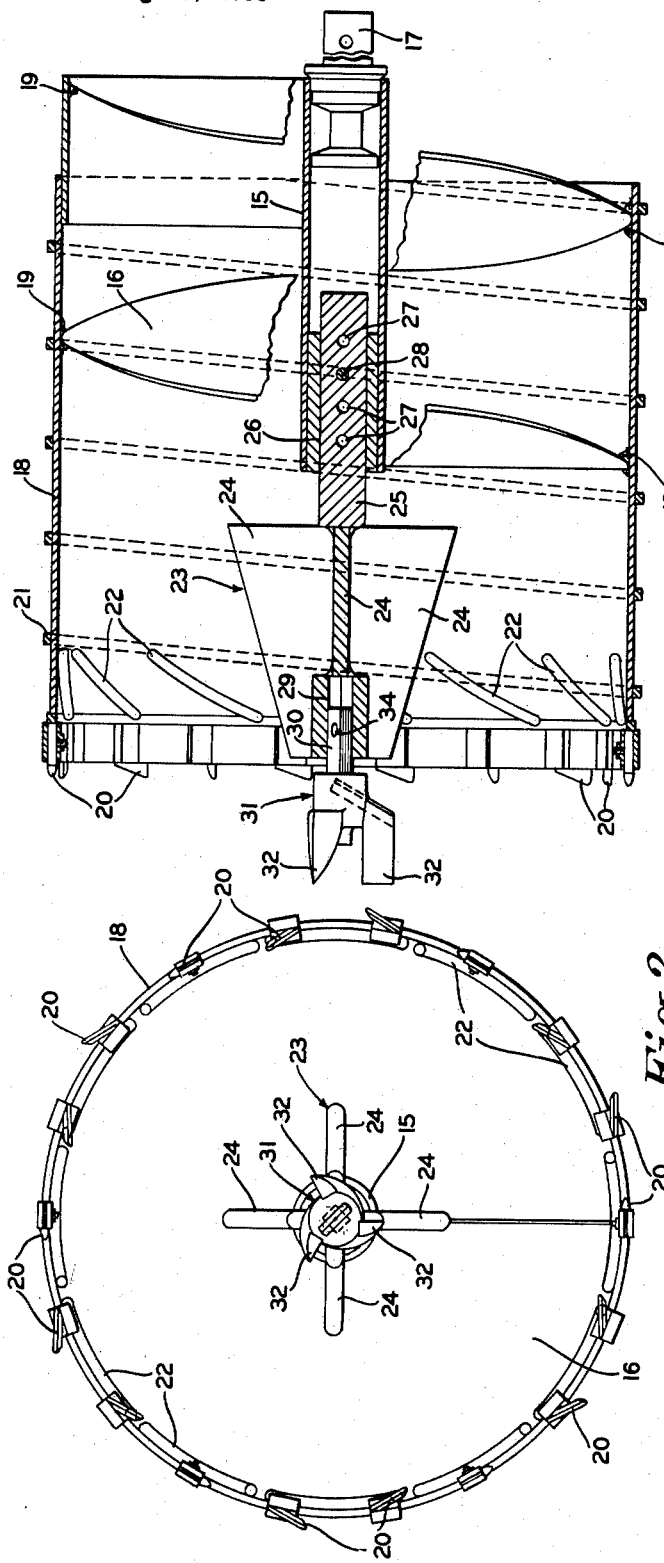
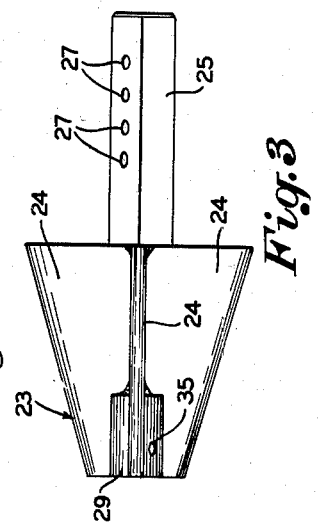
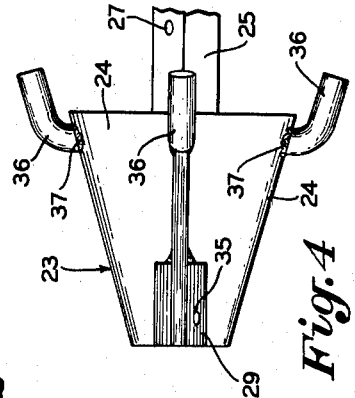
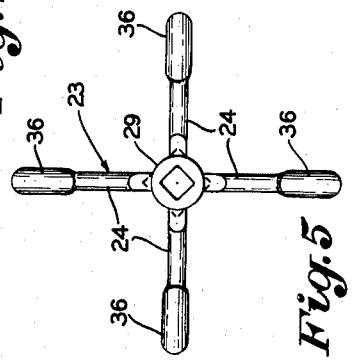
INVENTOR.
Vincent J. M<sup>c</sup>Carthy &
BY Harry L. Weikart
Frease & Bishop
ATTORNEYS

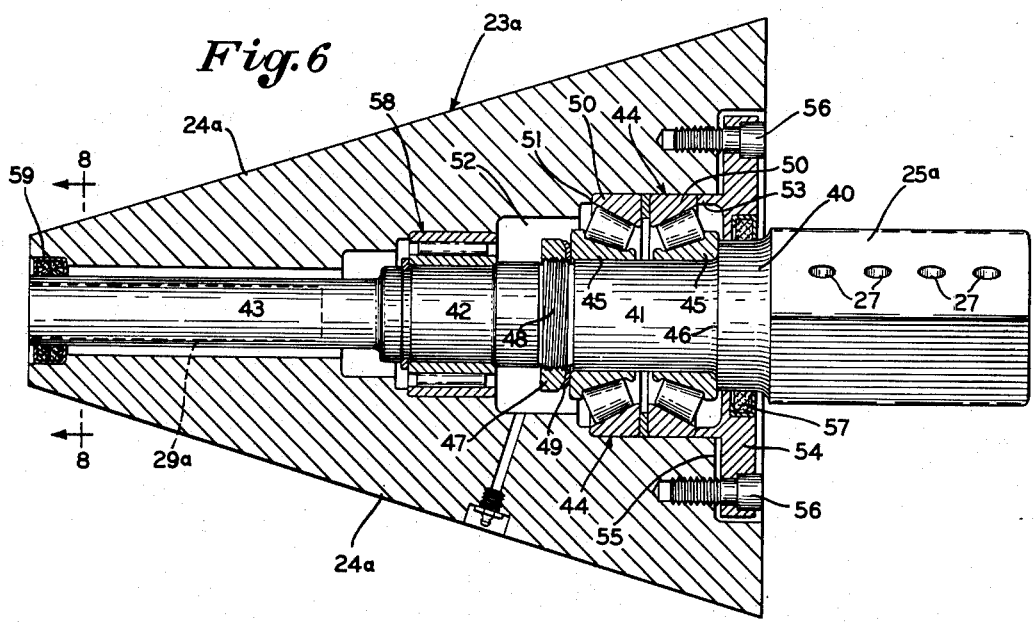
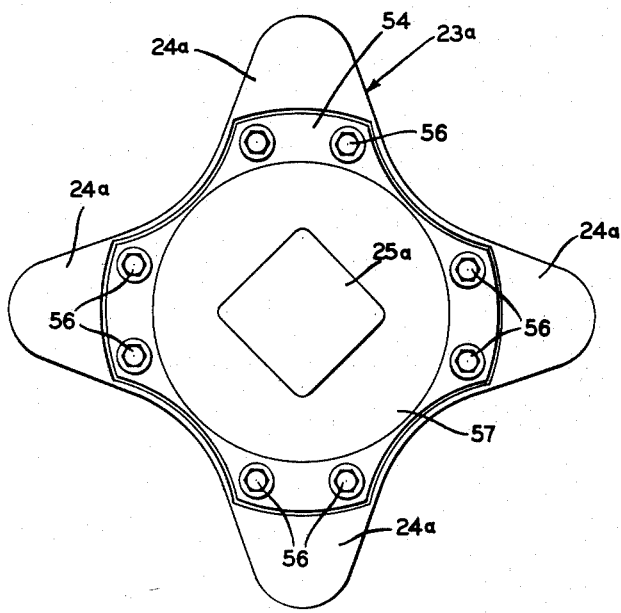
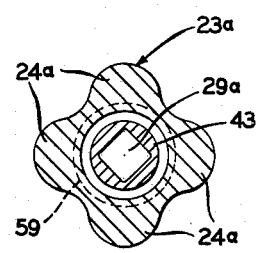

Oct. 11, 1955 V. J. McCARTHY ET AL 2,720,391
AUGER BORING HEAD FOR MINING COAL AND OTHER MINERALS
Filed Aug. 3, 1953 3 Sheets-Sheet 3

INVENTOR.
Vincent J. M<sup>c</sup>Carthy &
BY Harry L. Weikart
Frease & Bishop
ATTORNEYS United States Patent Office 2,720,391
Patented Oct. 11, 1955

2,720,391

AUGER BORING HEAD FOR MINING COAL AND OTHER MINERALS

Vincent J. McCarthy, Youngstown, and Harry L. Weikart, Salem, Ohio, assignors to The Salem Tool Company, Salem, Ohio, a corporation of Ohio Application August 3, 1953, Serial No. 372,052

10 Claims. (Cl. 262—9)

The invention relates to coal mining machines, and more particularly to a boring head of the general type of Joy Patent No. 1,445,085 dated February 13, 1923, in which a rotary boring head cuts a cylindrical kerf in the coal seam, and a breaker within the boring head bursts the cylindrical core of coal thus cut, screw conveyor means being provided for conveying the lumps of coal outwardly.

It is therefore an object of the invention to provide a boring head comprising an auger of relatively large diameter, a tubular casing surrounding and rigidly attached to the auger, and extending forwardly therefrom with cutting means upon the leading end of the tubular casing, and central cutting means, within the tubular casing, at the forward end of the auger, followed by a conical wedging member.

Another object is to provide a boring head of the general type referred to, in which the breaker is in the form of a plurality of radially disposed, conical wings, the forward ends of which are of less size than the hole cut in the coal seam by the inner cutting means.

It is also an object of the invention to provide such a boring head in which the breaker is rotatably mounted relative to the cutting means.

A further object is to provide a boring head of the character referred to in which radially disposed horns are attached to the larger ends of one or more of the wings of the breaker.

A still further object is to provide a boring head of this general type, in which the breaker is mounted upon the auger shaft by means of roller bearings.

The above objects together with others which will be apparent from the drawings and following description, or which may be later referred to, may be attained by constructing the improved auger boring head in the manner hereinafter described in detail and illustrated in the accompanying drawings, in which:

Fig. 1 is a longitudinal sectional view through an auger boring head embodying the invention;

Fig. 2 is a front elevation of the head;

Fig. 3 is a detached, side elevation of the breaker member;

Fig. 4 is a view similar to Fig. 3, showing the vanes or wings of the breaker provided with extensions or horns;

Fig. 5 is a front end elevation of the breaker shown in Fig. 4;

Fig. 6 is an enlarged, detached, longitudinal sectional view of a modified form of breaker adapted to be rotatably mounted relative to the boring head;

Fig. 7 is a rear end elevation of the breaker shown in Fig. 6;

Fig. 8 is a transverse, sectional view, taken as on the line 8—8, Fig. 6;

Figure 9:
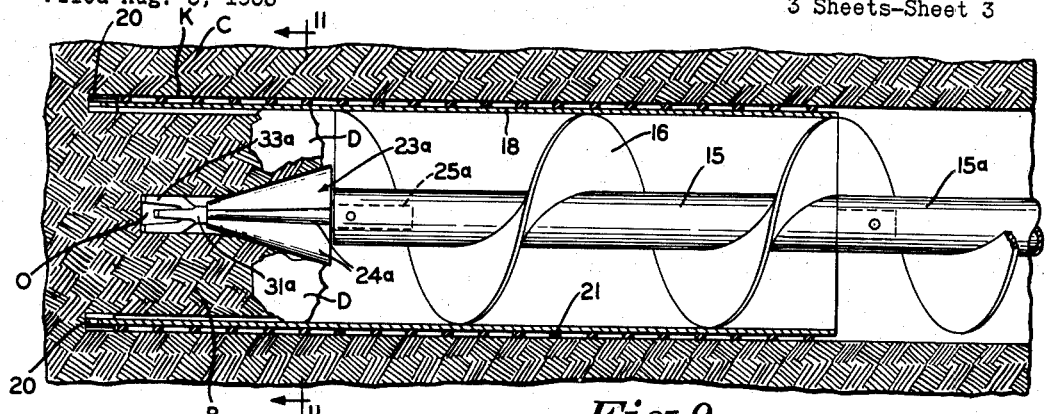
Fig. 9 is a vertical section through a coal seam showing the improved auger boring head in operation therein.
Figure 10:
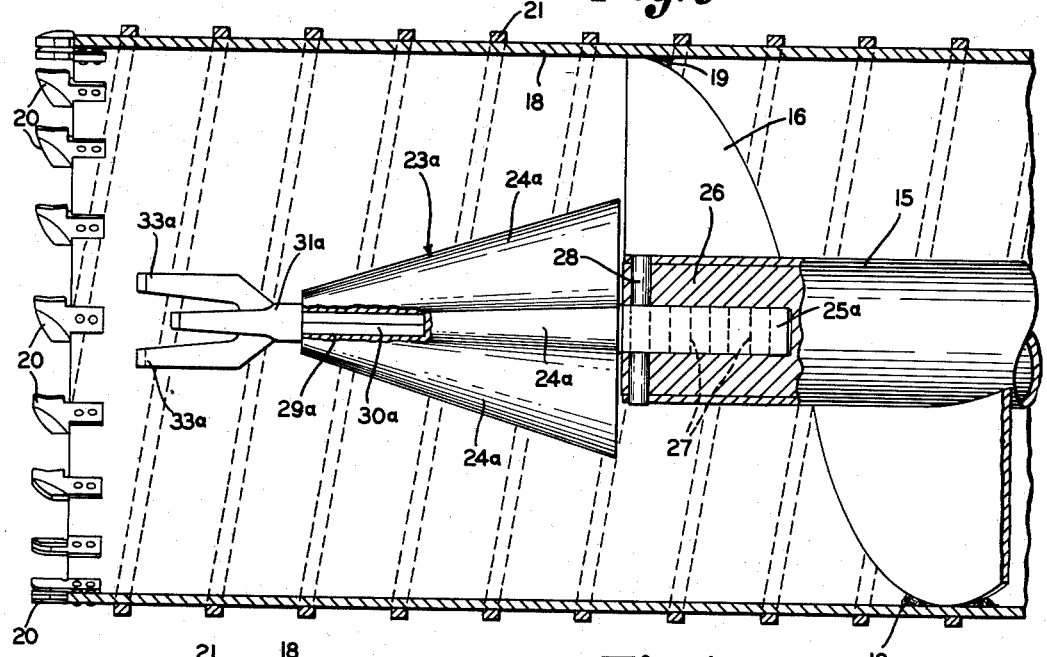
Fig. 10 is an enlarged, longitudinal sectional view of an auger boring head provided with the breaker shown in Fig. 6; and, Fig. 11 is a transverse sectional view through the coal seam, taken as on the line 11—11, Fig. 9.

Referring now to the embodiments of the invention illustrated, in which similar numerals refer to similar parts throughout, the improved auger boring head to which the invention relates is adapted to be associated with an auger of conventional design of relatively large diameter, which may be from 20 inch to as long as 60 inch diameter.

First referring more particularly to the construction shown in Figs. 1 to 5, an auger is shown comprising the usual tubular shaft 15, surrounded by a spiral flight or vane 16 having the conventional squared shank 17 at its rear end for engagement in a squared socket of a similar auger section, as in usual and well known practice.

A tubular cylinder 18 is disposed about the screw conveyor vane or flight 16, being welded or otherwise rigidly attached thereto as indicated at 19. This cylinder extends forwardly some distance beyond the end of the shaft 15 and spiral vane 16, as shown in Fig. 1, and is provided at its forward end with cutting means, comprising a plurality of cutting bits 20 located at different angles, as shown in Fig. 2, so as to cut a circular kerf or groove into the seam of coal or other mineral being mined, of greater thickness than the wall thickness of the cylinder 18.

If desirable or necessary, a spiral rib or projection 21 may be provided on the exterior of the cylinder 18, for carrying rearwardly along the outside of the cylinder, as it rotates and advances, chips and dust cut from the coal seam which do not find their way to the inside of the cylinder. Also, if desired, spiral or angular ribs 22 may be provided upon the interior of the cylinder 18 near the forward end thereof.

At the forward end of the shaft 15 is located a breaker, indicated generally at 23, which in these views is shown as comprising four radially disposed blades or wings 24 of wedge shape, being tapered toward the forward end of the boring head and preferably located at a 90 degree angle to each other as best shown in Fig. 2.

These blades or wings are welded or otherwise rigidly connected together in this position and connected at their rear ends to a squared shank 25 adapted to be received within the squared socket 26 at the forward end of the shaft 15. This shank is provided with a plurality of apertures 27 for selectively receiving a pin 28 adapted to be located through diametric apertures in the socket 26 for attaching the breaker in adjusted position.

At the forward end of the breaker thus formed is located a socket 29, adapted to receive the shank 30 of a central cutting member or inner cutting means, indicated generally at 31 and having fixed therein a plurality of cutting bits 32. The shank 30 of the inner cutting means is adapted to be connected to the breaker as by a pin 34 located through the diametric apertures 35 in the socket 29 thereof.

As shown in Figs. 4 and 5, the breaker may be provided with rearwardly and outwardly inclined rigid horns or arms 36, welded or otherwise attached to the edge portions of the blades or vanes 24, at the rear ends thereof, as indicated at 37 and extending rearwardly and outwardly beyond the same.

These horns or arms are often desirable for use within larger diameter tubular cylinders, in order to assist in breaking extremely large lumps of coal into lumps sufficiently small in size for commercial use, as will be later explained.

In Figs. 6 to 11 is shown a somewhat modified form of the invention in which the breaker is rotatably mounted relative to the cylinder. In this embodiment of the invention, the auger and cylinder may be substantially as shown in Figs. 1 and 2 and above described, and these parts are indicated by the same reference numerals as in Figs. 1 and 2.

The breaker, indicated at 23a, comprises generally the four tapered wings or blades 24a which, as best shown in Figs. 6 and 7, may be cast or otherwise formed as an integral unit rotatably connected to the shaft 15 of the auger so as to be movable relative thereto.

An integral shaft 40 is formed upon the forward end of the shank 25a and is reduced as at 41 and again at 42 and finally terminates in the further reduced forward end portion 43. The breaker 23a may be rotatably mounted upon the shaft by means of any suitable anti-friction bearing such as the pair of oppositely disposed tapered roller bearings 44 located upon the portion 41 of the shaft.

The cone members 45 of these roller bearings fit tightly upon the portion 41 of the shaft, one of these cone members bearing against the shoulder 46 of the shaft and the other bearing against the nut 47, which is adjustably mounted upon the threaded portion 48 of the shaft, a gasket or washer 49 being located therebetween.

The cup 50 of one of the roller bearings engages the internal shoulder 51, in the central bore 52 of the breaker 23a, and the cup 50 of the other roller bearing is engaged by the annular flange 53 of the adjusting plate 54 which is connected to the rear end of the breaker within the socket 55 as by the cap screws 56. A dust or oil seal 57 may be carried by this adjusting plate for contact with the periphery of the shaft 40.

A straight roller bearing, indicated generally at 58, is located around the portion 42 of the shaft, and a dust and oil seal 59 is preferably located within the breaker at the forward end of the shaft portion 43.

Inner cutting means 31a, including bits 33a, is adapted to be connected to the forward end of the breaker, the shank 30a thereof being received in a socket 29a at the forward end of the breaker shaft portion 43.

In either form of the invention, as many conventional auger sections as may be required, depending upon the depth it is desired to bore into the seam of coal or other mineral being mined, as indicated at 15a in Fig. 9 may be attached in usual and well known manner.

Figure 11:
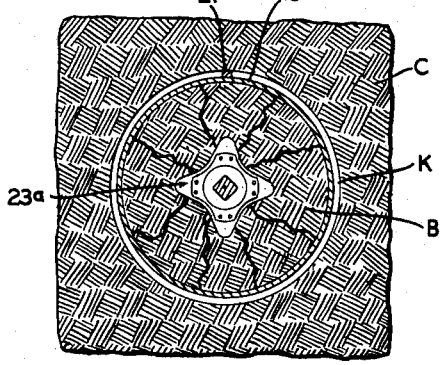

In the operation of the improved boring head, the auger and cylinder unit is rotated by any suitable boring machine and simultaneously advanced into the seam of coal or the like as indicated at C in Figs. 9 and 11.

As the head is thus rotated and advanced into the coal seam, the peripheral cutting bits 20 at the leading end of the tubular cylinder 18 will cut a circular kerf or groove in the seam of coal, as indicated at K in Figs. 9 and 11, producing a cylindrical core B of coal or other mineral being mined.

The central or inner cutting means, 33 or 33a as the case may be, will bore a central opening O into the cylindrical core B and will be followed by the conical or wedge breaker 23 or 23a as the case may be. It will be noted that in each case the forward end of the breaker is small enough to enter the opening O cut by the inner cutting means.

The breaker will exert an outwardly radial pressure within the opening, breaking the core B into blocks, as indicated at D, which will be carried back through the auger in usual and well known manner into a conveyor or other mechanism for collecting the coal as it is extracted from the mine.

In the embodiment of Figs. 1 to 5, the tapered or wedge breaker 23 revolves and advances with the shaft within the core of coal to burst the same. In cases where the arms or horns 36 are attached to the blades or vanes 24 of the breaker, for use especially within relatively large diameter tubular cylinders 18, these arms or horns function to break extremely large lumps of coal sufficiently that they will be practical for commercial use.

In the embodiment of the invention shown in Figs. 6 to 11, the breaker 23a being rotatably mounted upon the shaft of the boring head as above described, it will be seen that as the head is advanced forcing the breaker into the central opening O produced by the inner cutting means, the breaker will be moved forward into the core of coal without rotating and will burst the core into blocks by wedging action. If desired, horns or arms such as shown in Figs. 4 and 5 may be mounted upon the vanes or blades of the breaker 23a.

It will be apparent from the above that in each embodiment of the invention there is a rotatable and advanceable tubular cylinder having cutting means at its forward end and an inner rotating cutting means, followed by a tapered or wedge breaker having radial, forwardly tapered blades or vanes which enter into and burst the core of coal as it is cut by the outer cutting means upon the cylinder. This core of coal is thus broken into lumps of suitable size for use, which are continuously conveyed rearwardly through the auger and discharged at the outer end thereof.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

We claim:

1. An auger boring head comprising a rotatable and advanceable tubular cylinder, peripheral cutting means at the forward edge of the tubular cylinder for cutting a cylindrical kerf into a seam of coal and the like upon rotation and advancment of the cylinder, a breaker within the cylinder coaxial therewith, said breaker comprising four equally spaced radially disposed forwardly tapered vanes rigidly connected together at their inner edges, rearwardly and outwardly disposed horns fixed upon the rear portions of said vanes, inner cutting means located at the forward end of the breaker, the forward end of the breaker being small enough to enter the opening formed by the inner cutting means, the rear end of the breaker being larger than said opening, and a spiral auger located within the cylinder in the rear of the breaker.

2. An auger boring head as set forth in claim 1, in which the breaker is rotatable relative to the cylinder.

3. An auger boring head as set forth in claim 1, in which a shaft is located in the cylinder and coaxial therewith, the breaker being rotatably mounted upon said shaft.

4. An auger boring head as set forth in claim 1, in which a shaft is located in the cylinder and coaxial therewith, the breaker being rotatably mounted upon said shaft, and an anti-friction bearing is located between the breaker and the shaft.

5. An auger boring head as set forth in claim 1, in which a shaft is located in the cylinder and coaxial therewith, the breaker being rotatably mounted upon said shaft, and a tapered roller bearing is located between the breaker and the shaft.

6. An auger bearing head as set forth in claim 1, in which the breaker is fixed relative to the cylinder.

7. An auger boring head as set forth in claim 1, in which a shaft is located in the cylinder and coaxial therewith, the breaker being fixed upon said shaft.

8. An auger boring head as set forth in claim 1, in which said horns comprise round metal bars.

9. An auger boring head as set forth in claim 1, in which said horns are curved outwardly and rearwardly and terminate in rearwardly and outwardly inclined straight portions.

10. An auger boring head as set forth in claim 1, in which the outer edges of said vanes are rounded.

References Cited in the file of this patent

UNITED STATES PATENTS

| | | |
|---|---|---|
| 966,377 | Barker | Aug. 2, 1910 |
| 1,511,957 | Freda | Oct. 14, 1924 |
| 2,562,841 | Compton | July 31, 1951 |

FOREIGN PATENTS

| | | |
|---|---|---|
| 5,419 | Germany | Aug. 3, 1878 |
| 812,906 | Germany | Sept. 6, 1951 |